United States Patent
Nakamura

(10) Patent No.: US 7,563,031 B2
(45) Date of Patent: Jul. 21, 2009

(54) ROLLING BEARING

(75) Inventor: Shohei Nakamura, Kuwana (JP)

(73) Assignee: NTN Corporation, Osaka (JP)

( * ) Notice: Subject to any disclaimer, the term of this patent is extended or adjusted under 35 U.S.C. 154(b) by 343 days.

(21) Appl. No.: 11/417,208

(22) Filed: May 4, 2006

(65) Prior Publication Data

US 2006/0257061 A1 Nov. 16, 2006

(30) Foreign Application Priority Data

May 13, 2005 (JP) .............................. 2005-141464

(51) Int. Cl.
*F16C 32/00* (2006.01)

(52) U.S. Cl. ...................................................... 384/448
(58) Field of Classification Search ................... 384/448
See application file for complete search history.

(56) References Cited

U.S. PATENT DOCUMENTS 7,320,257 B2    1/2008    Takizawa et al.

FOREIGN PATENT DOCUMENTS

| JP | 2004-116729 | 4/2004 |
|---|---|---|
| JP | 2004-239746 | 8/2004 |
| JP | 2005-031063 | 2/2005 |

OTHER PUBLICATIONS

Notice of Grounds of Rejection issued Jan. 13, 2009 in a foreign counterpart to the present application (and its partial English translation).

Japanese Office Action dated Mar. 31, 2009 in corresponding Japanese Application No. 2005-141464 (including partial English translation).

*Primary Examiner*—Thomas R Hannon
(74) *Attorney, Agent, or Firm*—Wenderoth, Lind & Ponack, L.L.P.

(57) ABSTRACT

A rolling bearing includes an outer stationary ring, an inner rotating ring, and a plurality of rollers disposed between the inner and outer rings. An optical sensor is mounted on the outer ring. A computer receives the output of the optical sensor to calculate the revolving speed of the rollers from the number of rollers that pass the sensor per unit time, as detected by the optical sensor. The computer then calculates the time-integrated difference between the revolving speed of the rollers and the rotational speed of a rotary shaft on which the inner ring is mounted, as detected by a rotational sensor. Based on the thus obtained difference, it is possible to detect skidding of the rollers at an earlier stage.

8 Claims, 3 Drawing Sheets

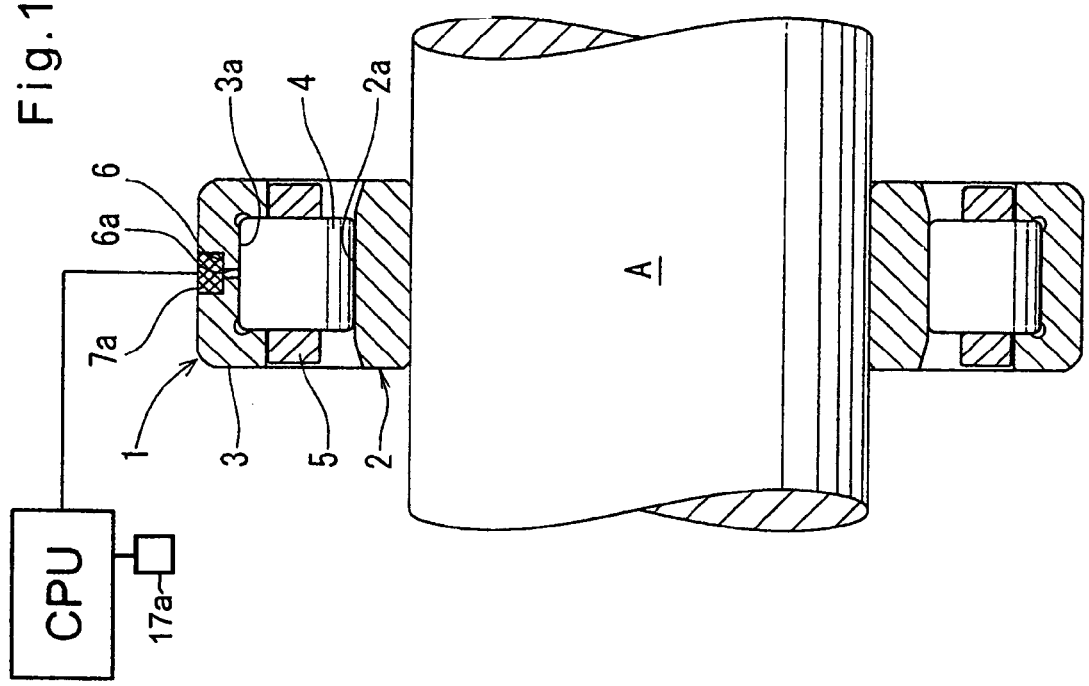
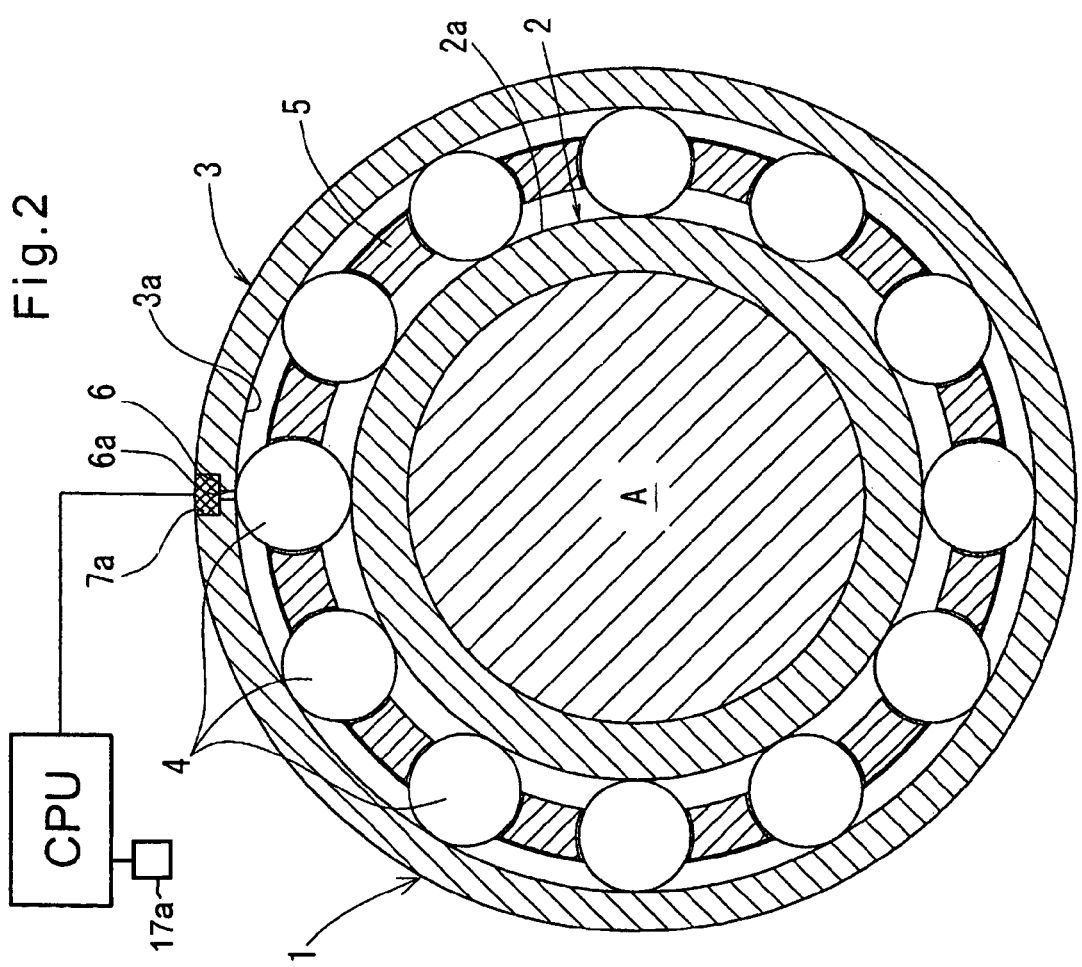

ROLLING BEARING

BACKGROUND OF THE INVENTION

This invention relates to rolling bearings in general, and particularly a rolling bearing for supporting a rotary shaft that rotates at a high speed under small radial loads.

As disclosed in JP patent publication 2004-116729, in a rolling bearing for supporting a rotary shaft that rotates at a high speed under small radial loads, such as a main shaft of a jet engine or a spindle of a gas turbine for various industrial machines, its rolling elements, which are retained between the inner and outer rings by a retainer, tend to skid, instead of roll, on the raceways of the inner and outer rings. Excessive skidding of the rolling elements may result in surface damage called smearing on the raceways of the inner and outer rings or the rolling surfaces of the rolling elements. Smearing may develop into surface peeling of the raceways or rolling surfaces, which may in turn cause vibrations or seizure, thus significantly impairing the function of the bearing.

Because smearing and surface peeling resulting from skidding of the rolling elements severely impair the function of the bearing, it is desired to detect the degree of skidding during operation of the bearing as quickly as possible. It is especially acutely desired to detect such skidding in bearings supporting main shafts of jet engines because extremely high level of safety is required for jet engines.

Typically, a jet engine is provided with a sensor for detecting metallic debris in lubricating oil including lubricating oil for bearings. Thus, if surface peeling occurs, the sensor detects debris peeled off bearing parts, thus detecting the surface peeling itself, so that it is possible to inform the pilot of this fact. But it is desired to detect possible smearing and surface peeling beforehand, i.e. before such smearing or surface peeling actually occurs.

An object of the present invention is to provide a rolling bearing including means for detecting skidding of the rolling elements at an earlier stage.

SUMMARY OF THE INVENTION

According to the present invention, there is provided a rolling bearing comprising an inner ring formed with a first raceway, an outer ring formed with a second raceway, a plurality of rolling elements disposed between the first and second raceways and configured to revolve about an axis of the rolling bearing along the first and second raceways, an annular retainer retaining the rolling elements in position, and a detector for detecting the revolving speed of the rolling elements.

If the rolling elements skid, a difference is produced between the revolving speed of the rolling elements and the rotational speed of the bearing. Thus, according to the present invention, the detector detects this difference to detect any skidding of the rolling elements at an earlier stage. The rotational speed of the bearing is detectable from the rotational speed of the rotary shaft on which the rotating bearing ring is fixedly mounted or the rotating bearing ring itself, using a known rotation sensor. If the device on which the rolling bearing according to the present invention is mounted includes a rotation sensor for its rotary shaft as with a main shaft of a jet engine, this sensor can be used as it is.

The detector for detecting the revolving speed of the rolling elements preferably comprises a non-contact type sensor mounted on one of the inner and outer rings that is stationary and configured to detect the passage of the rolling elements when the rolling elements are revolving along the first and second raceways, and a computing unit for receiving an output of the sensor and calculating the revolving speed of the rolling elements from the number of the rolling elements passing the sensor per unit time. The non-contact type sensor may be an optical sensor or a magnetic sensor.

The detector may detect the revolving speed of the rolling elements by detecting the rotational speed of the annular retainer, which rotates as the rolling elements revolve.

Preferably, the detector comprises at least one detected portion provided on the annular retainer at its portion offset from the center of rotation of the retainer, a non-contact type sensor for detecting the passage of the detected portion, and a computing unit for receiving an output of the sensor and calculating the rotational speed of the retainer from the number of times the detected portion passes the sensor per unit time. The detected portion of the retainer may be a geometric element such as a radial groove or rib, an optical element such as a light reflecting plate, a mirror surface or a differently colored portion, or a magnetic element such as a magnet or a magnetic portion. The non-contact type sensor for detecting the passage of the detected portion is selected from optical sensors, magnetic sensors, etc. according to the type of the detected portion.

Any of the above-described rolling bearings according to the present invention is suitable for use in supporting the main shaft of a jet engine.

The rolling bearing according to the present invention is provided with the detector for detecting the revolving speed of the rolling elements. Thus, it is possible to detect skidding of the rolling elements at an earlier stage from the difference between the revolving speed of the rolling elements, as detected by t his detector, and the rotational speed of the bearing, and thus to prevent smearing and surface peeling.

BRIEF DESCRIPTION OF THE DRAWINGS

Other features and objects of the present invention will become apparent from the following description made with reference to the accompanying drawings, in which:

FIG. 1 is a vertical sectional front view of a rolling bearing of a first embodiment according to the present invention;

FIG. 2 is a vertical sectional side view of FIG. 1;

DETAILED DESCRIPTION OF THE PREFERRED EMBODIMENTS

Figure 3:
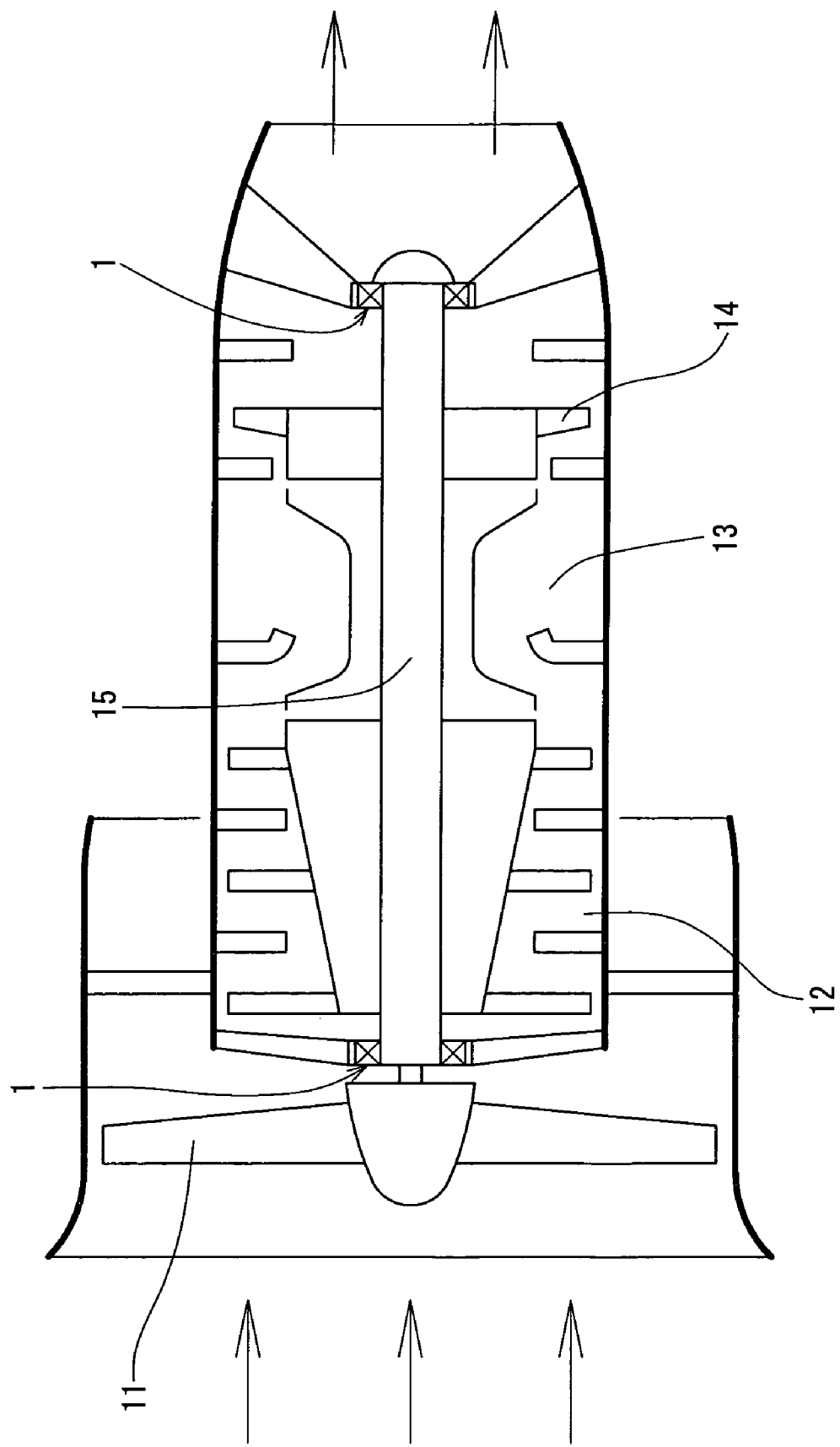
FIG. 3 is a schematic sectional view of a jet engine in which rolling bearings as shown in FIG. 1 are used.

Now the embodiments of the present invention are described in detail with reference to the accompanying drawings. FIGS. 1 to 3 show the first embodiment of the present invention. As shown in FIGS. 1 and 2, the rolling bearing 1 of the first embodiment comprises an inner ring 2 formed with a raceway 2a, an outer ring 3 formed with a raceway 3a, and a plurality of rollers 4 as rolling elements disposed between the raceways 2a and 3a and retained by a retainer 5. The inner ring 2 is a rotating ring fixedly mounted on a rotary shaft A. The outer ring 3 is stationary.

A recess 6 is formed in the radially outer surface of the stationary outer ring 3. A hole 6a extends radially through the outer ring 3 from the radially inner wall of the recess 6 to the raceway 3a. A non-contact type optical sensor 7a is mounted in the recess 6 to detect the passage of the rollers 4 when the rollers 4 roll along the raceways 2a and 3a.

A computer or a central processing unit (CPU) receives the output of the optical sensor 7a and calculates the revolving speed $V_T$ of the rollers 4 about the axis of the bearing from the number of rollers 4 passing the sensor 7a per unit time, as detected by the optical sensor 7a. The CPU also receives the output of a rotation sensor 17a for detecting the rotational speed $V_A$ of the rotary shaft A, which rotates at the same speed as the inner ring 2, to calculate the time-integrated difference $\Delta V$ between the rotational speed $V_A$ of the rotary shaft A and the revolving speed $V_T$ of the rollers 4.

FIG. 3 shows a jet engine including rolling bearings 1 according to the present invention. The jet engine is a turbofan engine which basically comprises an air intake fan 11, a main shaft 15, a compressor 12 having a rotor mounted on the main shaft 15 for partially compressing air taken in, a combustion chamber 13 in which fuel is injected into the compressed air and burned, and a turbine 14 mounted on the main shaft 15 and rotated at a high speed by the combustion gas supplied from the combustion chamber 13. The main shaft 15 is rotatably supported by two rolling bearings 1 according to the present invention.

A controller (not shown) receives the output of an existing rotation sensor for detecting the rotational speed $V_A$ of the main shaft 15, and the output of the optical sensor 7a of each rolling bearing 1, calculates the revolving speed $V_T$ of the rollers 4 of each rolling bearing 1, and then calculates the time-integrated difference $\Delta V$ between the rotational speed $V_A$ of the main shaft 15 and the revolving speed $V_T$ of the rollers 4 of each rolling bearing 1. If the time-integrated difference $\Delta V$ increases to a predetermined value, the controller informs (provides an alert to) the pilot in the cockpit of this fact.

Figure 4:
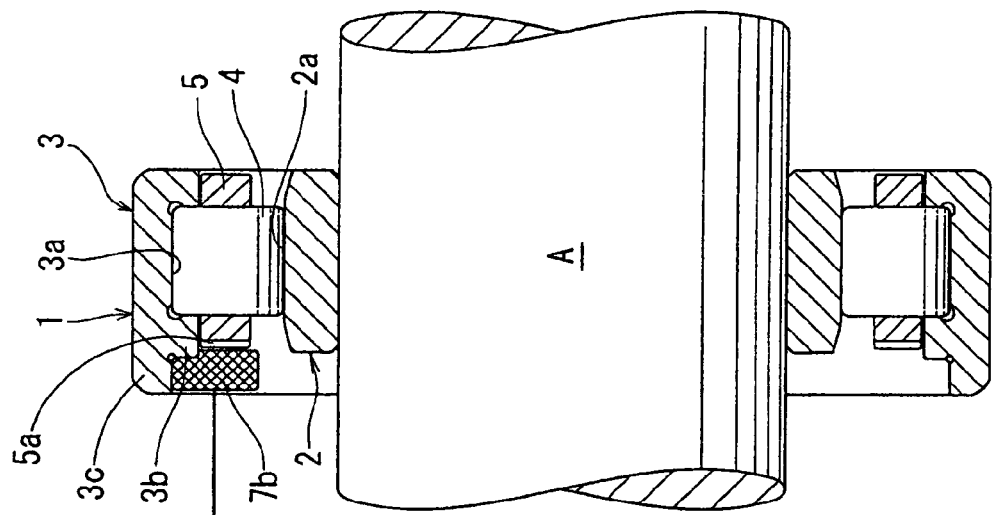
FIG. 4 is a vertical sectional front view of a rolling bearing of a second embodiment according to the present invention.
Figure 5:
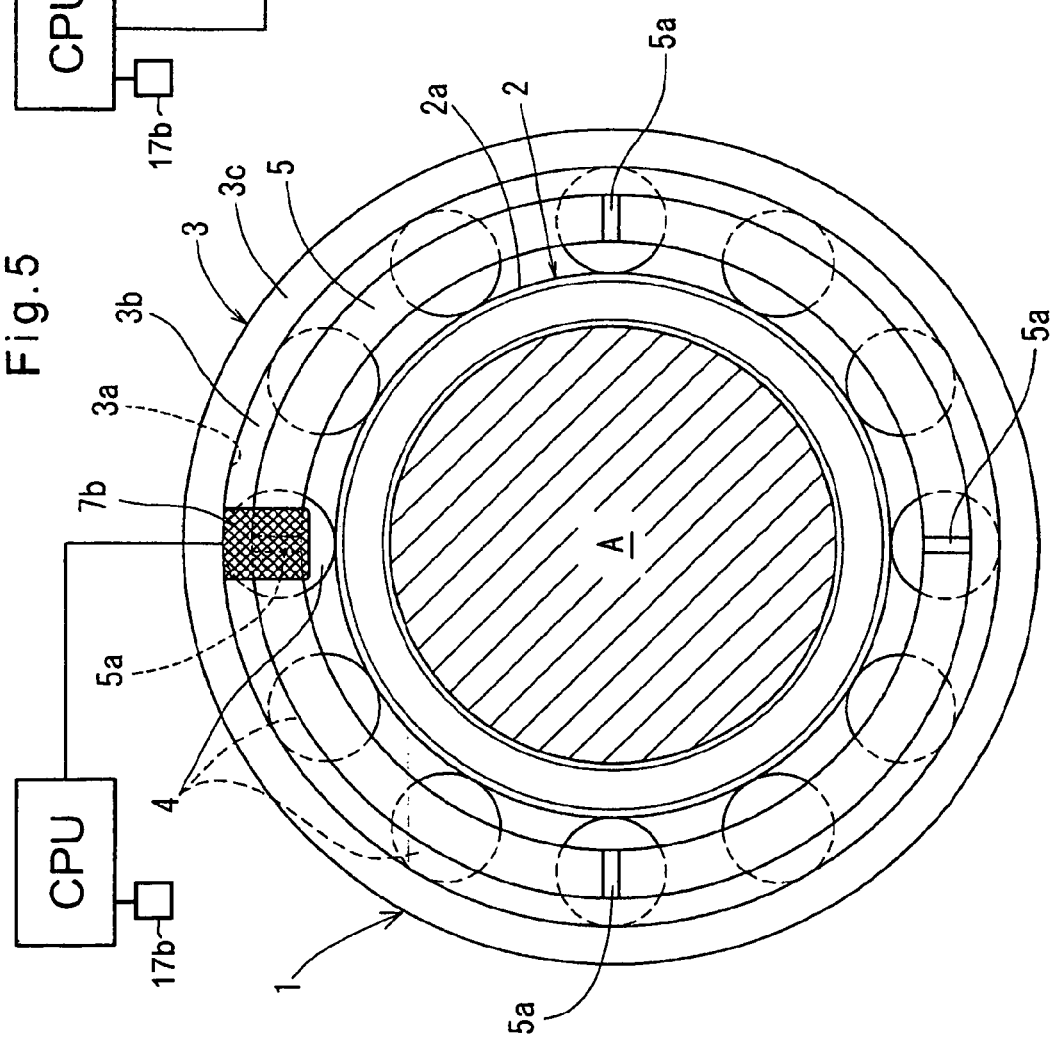
FIG. 5 is a side view of FIG. 4.

FIGS. 4 and 5 show the second embodiment, which is similar to the first embodiment in that the outer ring 3 is stationary. But in this embodiment, instead of the optical sensor 7a for detecting passage of the rollers 4, a non-contact type optical sensor 7b is mounted on an outwardly extending overhang 3c of one of the flanges 3b of the outer ring 3 so as to axially oppose one side surface of the annular retainer 5. In this one side surface of the retainer 5, four radial grooves 5a are formed circumferentially spaced apart from each other at angular intervals of 90 degrees.

In this embodiment, the optical sensor 7b detects the passage of the grooves 5 when the retainer 5 is rotating. A computer or a central processing unit CPU receives the output of the optical sensor 7b and calculates the rotational speed $V_H$ of the retainer 5, which is supposed to be equal to the revolving speed $V_T$ of the rollers 4, from the number of grooves 5a passing the sensor 7b per unit time. The CPU also receives the output of a rotation sensor 17b for detecting the rotational speed $V_A$ of the rotary shaft A, and calculates the time-integrated difference $\Delta V$ between the rotational speed $V_H$ of the retainer 5 and the rotational speed $V_A$ of the rotary shaft A. The number of radial recesses 5a is not limited to four provided at least one recess 5a is provided.

Instead of the non-contact type optical sensor used in the embodiments, a non-contact type magnetic sensor may be used. Instead of the geometric radial grooves of the second embodiment, other geometric detected portions such as ribs may be used, or non-geometric detected portions may be used such as optical detected portions including light reflecting plates, mirror surfaces, differently colored portions, or magnetic detected portions including magnets or magnetic portions.

The rolling bearing of either of the embodiments is a roller bearing of which the outer ring is stationary. But the concept of the present invention is applicable to other bearings such as deep groove ball bearings and multi-point-contact bearings and to bearings of which the inner ring is stationary. In either of the embodiments, the CPU is shown to be provided outside the rolling bearing. But the CPU may be mounted inside the rolling bearing.

What is claimed is:

1. A rolling bearing arrangement comprising: a rolling bearing including an inner ring formed with a first raceway, an outer ring formed with a second raceway, a plurality of rolling elements disposed between said first and second raceways and configured to revolve about an axis of said rolling bearing along said first and second raceways, an annular retainer retaining said rolling elements in position, and a first detector for detecting the revolving speed of said rolling elements; a second detector for detecting the rotational speed of said rolling bearing; and a controller means for receiving outputs of said first and second detectors, calculating a time-integrated difference between the rotational speed of said rolling bearing and the revolving speed of said rolling elements and, if said time-integrated difference increases to a predetermined value, causing an alert to be produced.

2. The rolling bearing arrangement of claim 1 wherein said rolling bearing is arranged to support a main shaft of a jet engine.

3. The rolling bearing arrangement of claim 1 wherein said first detector comprises a non-contact type sensor mounted on one of said inner and outer rings that is stationary and configured to detect the passage of said rolling elements when said rolling elements are revolving along said first and second raceways, whereby the revolving speed of said rolling elements is calculated from the number of said rolling elements passing said sensor per unit time, as detected by said sensor.

4. The rolling bearing arrangement of claim 3 wherein said rolling bearing is arranged to support a main shaft of a jet engine.

5. The rolling bearing arrangement of claim 1 wherein said retainer rotates together with said rolling elements, and wherein said first detector detects the revolving speed of said rolling elements by detecting the rotational speed of said retainer.

6. The rolling bearing arrangement of claim 5 wherein said rolling bearing is arranged to support a main shaft of a jet engine.

7. The rolling bearing arrangement of claim 5 wherein said first detector comprises at least one detected portion provided on said annular retainer at its portion offset from the center of rotation of said retainer, and a non-contact type sensor for detecting the passage of said detected portion, whereby the rotational speed of said retainer is calculated from the number of said detected portion passing said sensor per unit time, as detected by said sensor.

8. The rolling bearing arrangement of claim 7 wherein said rolling bearing is arranged to support a main shaft of a jet engine.

* * * * *